United States Patent [19]

Bragaglia

[11] Patent Number: 5,086,947
[45] Date of Patent: Feb. 11, 1992

[54] AUTOMATIC BELT-TYPE DISPENSER, WITH TUBULAR CONTAINERS FOR THE ARTICLES

[76] Inventor: Giorgio Bragaglia, Via Pablo Neruda 5, Bologna, Italy

[21] Appl. No.: 687,947

[22] Filed: Apr. 19, 1991

[30] Foreign Application Priority Data

Apr. 24, 1990 [IT] Italy .................................. 3460 A/90

[51] Int. Cl.[5] .............................................. B65H 5/28
[52] U.S. Cl. ......................................... 221/72; 221/89; 221/194; 414/403; 414/418
[58] Field of Search .................. 221/70, 71, 72, 89, 221/97, 101, 102, 192, 194, 195, 253; 198/803.15; 414/403, 418

[56] References Cited

U.S. PATENT DOCUMENTS

| | | | |
|---|---|---|---|
| 628,656 | 7/1899 | Fisher | 221/253 X |
| 2,358,563 | 9/1944 | Donaldson | 221/253 X |
| 2,496,304 | 2/1950 | Muffly | 221/192 X |

Primary Examiner—Robert P. Olszewski
Assistant Examiner—Dean A. Reichard
Attorney, Agent, or Firm—Larson and Taylor

[57] ABSTRACT

The dispenser comprises a feed belt (C) provided with transversely-arranged, equally-spaced tubes (3) receiving the articles to be dispensed which are held therein by stationary boundary walls. While being transferred between two magazines (1-2) in which it is to be stacked, the feed belt is submitted to a slight temporary torsion in the longitudinal direction, so that one end of the tubes will be directed downwards and upon passing in registry with an underlying opening (9) it will permit the articles housed within the tubes to be discharged by the action of gravity. In the upper portion of the guide (F) submitting the charger to said torsion, there is provided an opening (13) with which the top ends of the tubes on the feed belt become aligned during the step-by-step movement of the latter in a direction opposite to the dispensing direction, in order to fill the tubes with new articles to be dispensed.

13 Claims, 3 Drawing Sheets

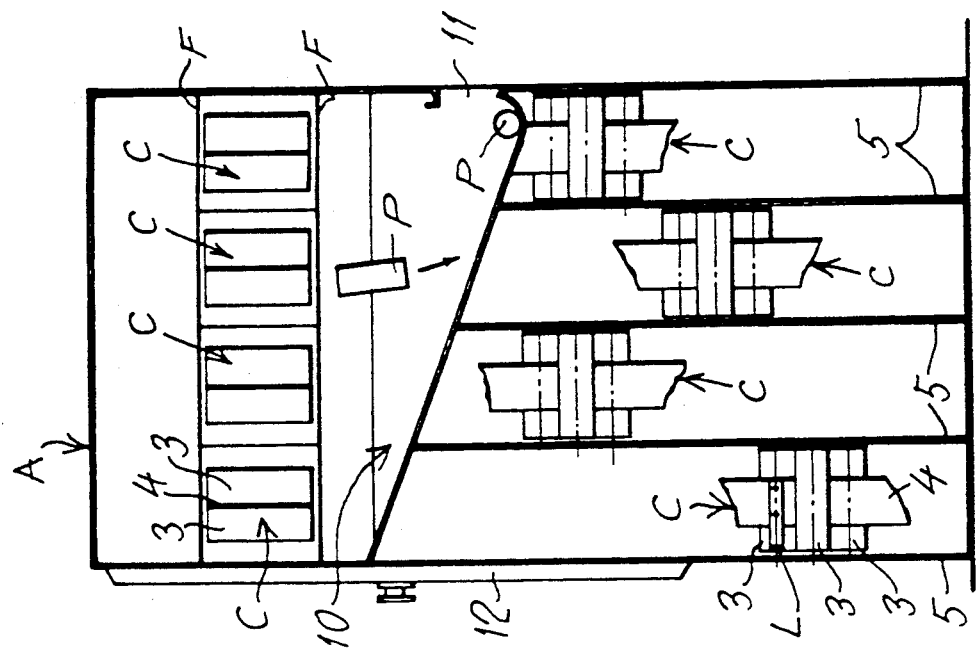
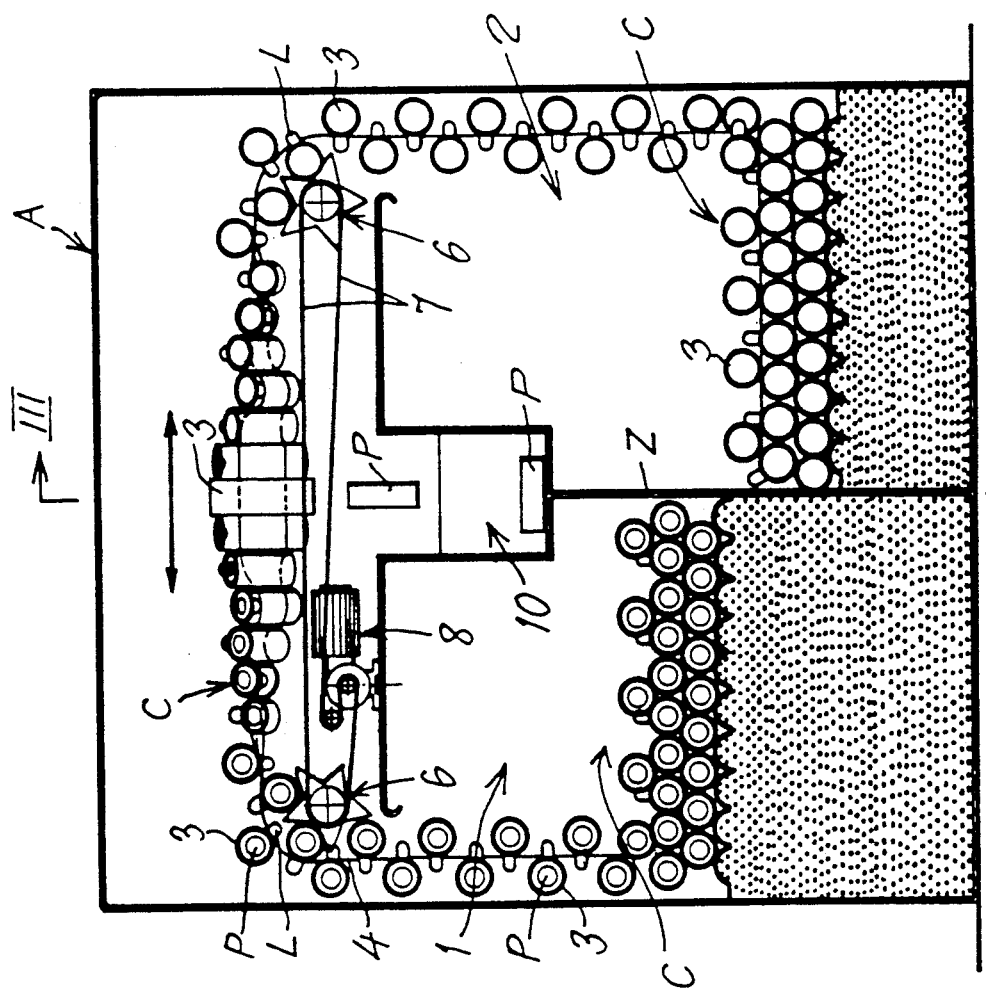

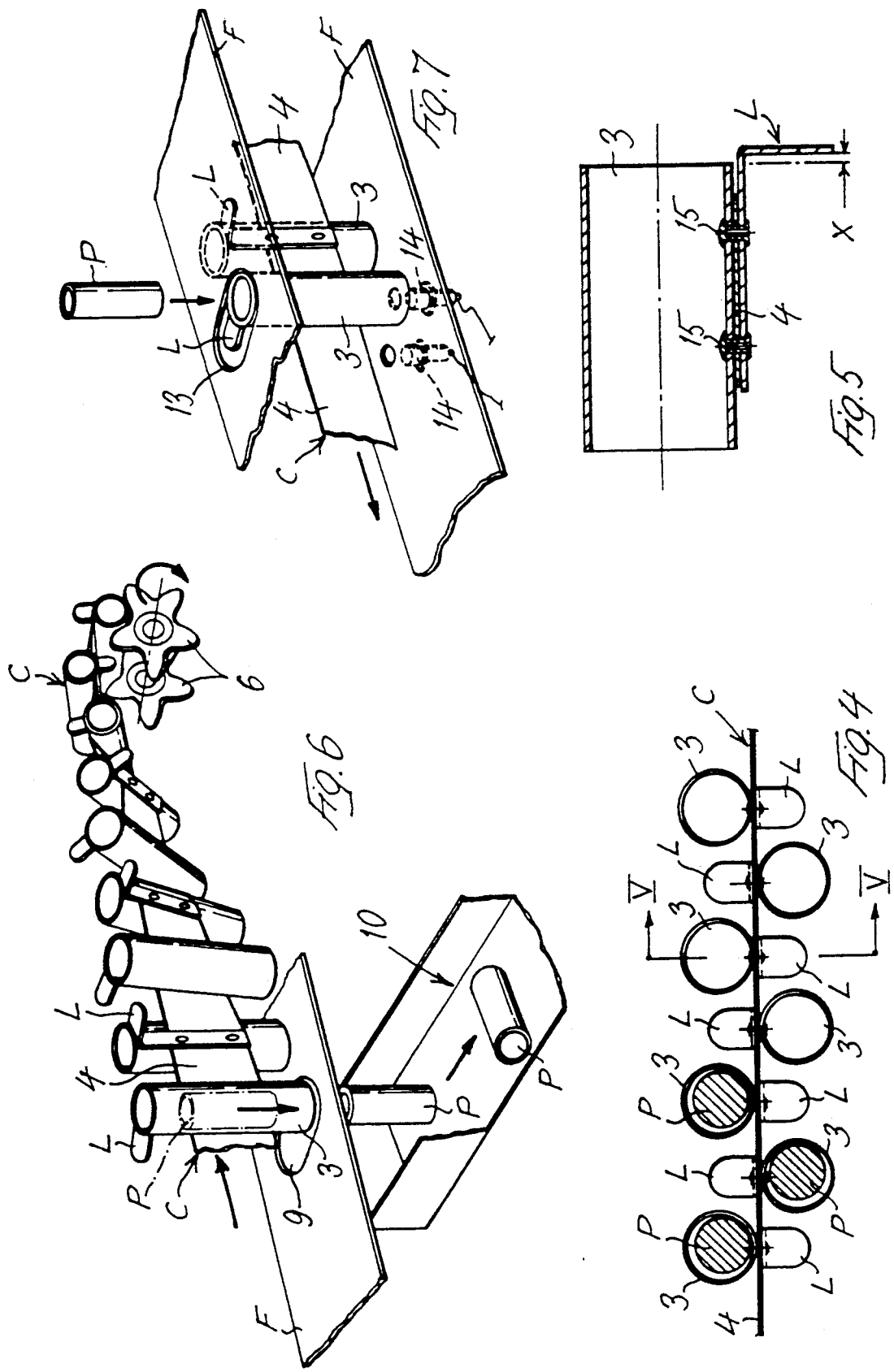

AUTOMATIC BELT-TYPE DISPENSER, WITH TUBULAR CONTAINERS FOR THE ARTICLES

BACKGROUND OF THE INVENTION

The invention relates to an automatic dispenser of any solid product, for example for dispensing rolls of coins or foodstuffs such as drinks, snacks or the like.

In the present dispensers intended for use, for example, with rolls of coins, the articles to be dispensed must have equal shape and size, and they are usually stacked onto each other thus creating contact pressures causing the formation of "bridges" and jamming the dispensing function. Also for this reason, the present dispensers cannot be used for dispensing irregular and soft articles, for example, small bags of candies.

The invention solves this problem since the article to be dispensed is loaded into a tube which serves as a protective container for said article, as a dispensing and re-loading element, and as a transfer element inasmuch as it is secured to a belt together with other identical containers to form a chain conveyor operatively meshing with driving sprockets.

The present dispenser may be constructed in various dimensions depending upon the articles to be dispensed, and even in a refrigerated version in case of foodstuffs or any other perishable goods. The storing capacity and functional autonomy of the dispenser is not impaired because the article-containing tubes (of equal dimensions and secured crosswise and equally spaced apart on the flexible conveyor belt), during the step of introduction into and withdrawal from the respective magazines, will stack spontaneously in a position which is comparable, for example, to that which is assumed by the rolls of coins in the presently-used dispensers.

An important advantage of the dispenser of the invention is that the inner dimensions of each tube are suitable for containing a variety of articles and not a single size of articles, so that no adjustment is needed in changing from an article of a given size to one of different size within the variety specified above. For example, in case of rolls of coins, the inner dimensions of the tubes are such as to accommodate the largest roll, so that the entire range of smaller rolls may be introduced into the tubes without requiring any particular adjustment. The adjustment of the known dispensers always creates problems and costs, and if not effected by skilled personnel it may cause troubles and malfunctions.

A further important characteristic of the invention resides in the dispensation of the articles. The dispensation is effected by the action of gravity, by taking advantages of the vertical or inclined position assumed by the tube due to a suitable diversion imparted to the belt carrying the tube. The tube containing therein the article to be dispensed is conveyed to register with an opening in the bottom of the diversion guide, so that the article will fall onto the outlet chute and may be withdrawn. Each step of advance of the feed belt causes the dispensation of an article. Obviously, a double-step movement causes the dispensation of two articles simultaneously, which is not possible in the presently-used dispensers, wherein each maneuver causes the dispensation of a single article. It is also to be noted that within a tube of the dispenser according to the invention there may be accommodated a plurality of articles.

The steps of advance of the feed belt according to the present dispenser are controlled by an electronic programmer connected to a conventional unit operated by coins, tokens, banknotes, magnetic cards, etc.

The automatic dispenser according to the invention may be provided with a plurality of feed belts with respective side-by-side magazines, containing articles even of different kinds, operating independently and such as to dispense the articles either from a single outlet or from different outlets.

BRIEF DESCRIPTION OF THE DRAWINGS

The invention will be explained with more detail hereinafter, with reference to the drawings showing, by way of non-limiting example, some preferred embodiments, and in which:

FIG. 1 is a front view of the dispenser, showing its internal portions;

FIG. 3 is a cross sectional view of the dispenser taken on the line III—III of FIG. 1;

FIG. 4 is an enlarged view of a portion of the feed belt provided with the tubular containers;

FIG. 5 shows a detail of the assembly of FIG. 4, as seen from the section line V-V;

FIG. 6 is a perspective view of a portion of the feed belt with its tubular containers, while discharging an article;

FIG. 7 is a perspective view of a portion of the feed belt with its tubular containers, while a container is being filled;

DESCRIPTION OF SOME PREFERRED EMBODIMENTS

With reference to FIGS. 1, 4 and 6, it will be seen that the dispenser uses feed belts C comprising a belt 4 of any suitable flexible material which is sufficiently resistant to mechanical stresses, for example, of the type which is used to form flat driving belts. Said belt has affixed thereto, by means of rivets 15, a plurality of crosswise-arranged, equally spaced apart tubular containers or tubes 3, preferably of identical dimensions, of round section or of any other suitable and sufficiently regular shape and which, preferably, protrude with portions of equal length from both sides of the belt. The tubes 3 may be made either of plastics material or other suitably rigid material, which is resistant to the mechanical stresses and non-toxic if the dispenser is intended for use with foodstuffs. The tubes 3 may be arranged, alternatively, either on both faces of the belt, as shown in the detail view of FIG. 4, or they may be arranged only on one face of said belt, as shown in the moification of FIG. 8 and as explained better hereinafter.

The dispenser according to the invention comprises a cabinet A in which two side-by-side opposite magazines 1-2 are formed, the first of which accommodates the feed belt C with the tubes containing the articles to be dispensed, while the second accommodates the same feed belt C with the tubes devoid of the dispensed articles. The wall Z which is common to both magazines may be either rigid or flexible. The two magazines are open at the top, and during a transfer from a magazine to the other, the feed belt C passes over the top portion of the cabinet A where it is controlled by driving and guiding means to be discussed below.

Figure 8:
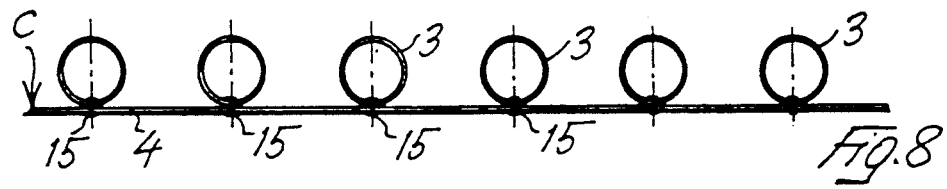
FIG. 8 shows a portion of the feed belt in which the tubular containers have been arranged differently.
Figure 9:
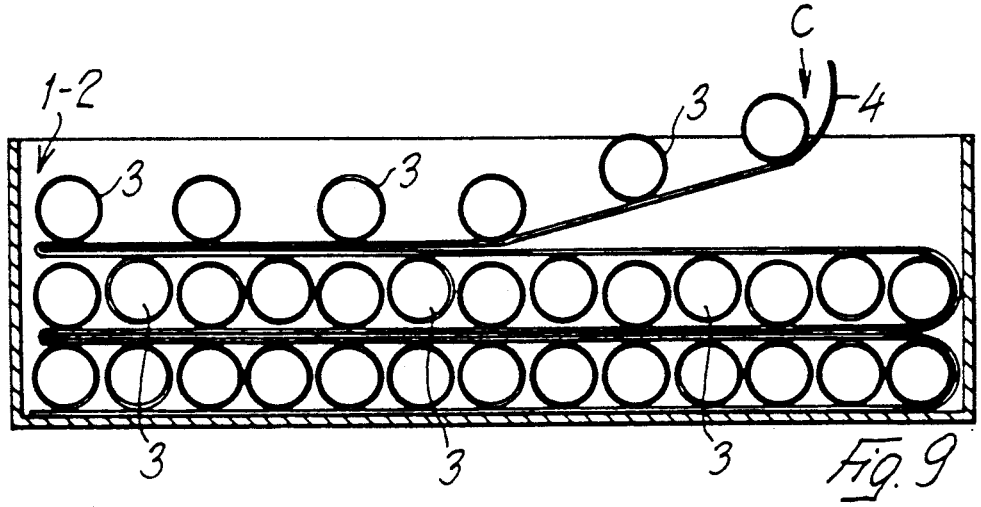
FIG. 9 is a detail front view showing the stacking of the tubular containers when secured to the belt as shown in FIG. 8.

Both in the case of FIG. 4 and in the case of FIG. 8, the space between two successive tubes secured on one face of the belt 4 is slightly larger than the diameter of a tube, so that when the feed belt C is stacked in the magazines 1 and 2, the tubes of one layer will be interposed between the tubes of the underlying layer, as shown in FIGS. 1 and 9, for maximum utilization of the space capacity of said magazines.

Figure 2:
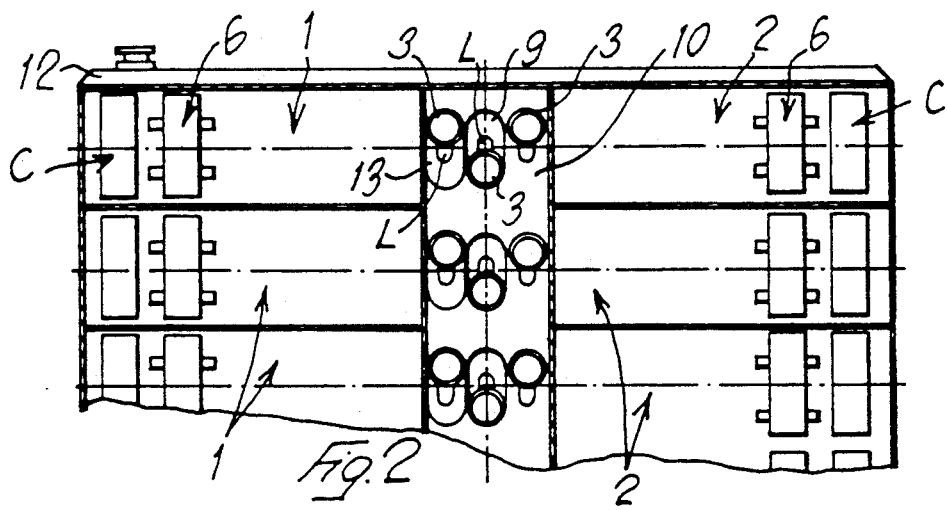
FIG. 2 is a top plan view of a portion of the dispenser.

FIGS. 2 and 3 show that the cabinet A may contain a plurality of side-by-side magazines 1-2 for containing and dispensing articles of different kinds.

The articles to be dispensed are arranged in the tubes 3 which are closed by the sidewalls 5 of the magazines 1-2 and by other stationary walls also during the transfer from one magazine to another one.

Figure 10:
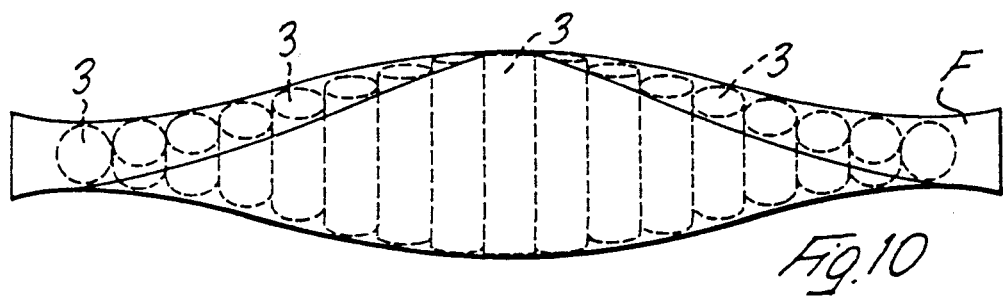
FIG. 10 is a diagrammatic view showing the stationary helical tubular guide for the feed belt of the dispenser.

In the top portion of the cabinet, the tubes 3 of the feed belt are in mesh with a pair of horizontal-axis sprockets 6 arranged both at the magazine 1 and at the magazine 2, interconnected to each other by a chain 7 which makes them rotate in the same direction and at the same speed, one of said pair of sprockets being selectively controlled by a reversible gearmotor 8 which is connected by an electronic programmer to a banknote selector or other control device. While being transferred from the magazine 1 to the magazine 2, the feed belt C is suitably stretched and is guided longitudinally in a stationary helical diverter F (which, for example, could be in the form of a tubular guide having rectangular section, as shown in FIG. 10). Said diverter F is designed to retain the articles in the tubes and to rotate the feed belt C transversely through 90°, first in a direction and then in the opposite direction, so that the tubes 3, at half their path of travel, will reach the top portion of the cabinet A in a vertical or inclined position, whereafter they will be re-positioned to their normal horizontal position before reaching their engagement position with the sprockets 6 of the magazine 2.

When a tube 3 reaches the vertical position, upon each step-by-step advance imparted to the feed belt C by the gearmotor 8, the lower end of said tube becomes aligned with an opening 9 in the bottom of the diverter F, and the article contained in said tube is discharged therethrough. Arranged below the discharge opening 9, which has an oval outline if the feed belt C is of the type shown in FIGS. 1 and 4 or a round outline if the feed belt is of the type shown in FIG. 8, there is a chute 10 sloping towards a door 11 through which the article discharged from the vertical tube 3 may be withdrawn.

When the feed belt with the filled tubes is nearly depleted, before its trailing end goes out of mesh from the sprockets 6 above the now empty magazine 1, a sensor (not shown) is energized to discontinue the operation of the dispenser and to activate an optical and/or acoustical signal to indicate that said feed belt is to be supplied with new articles. By opening a door 12 (FIGS. 2 and 3) arranged, for example, inside the bank premises if the articles to be dispensed are rolls of coins, the personnel in charge may have access into the upper portion of the cabinet A to fill the feed belt. From FIGS. 2 and 7 it can be seen that upstream of the discharge opening 9, with respect to the preceding direction of advance of the feed belt, in the top wall of the helical guiding diverter F there is formed an opening 13 and adjacent thereto is the top end of a tube 3 of the feed belt. After activating a control (not shown) which is suitably pre-set for the loading step, the operator introduces an article into the tube that is aligned with the opening 13 and when said article is detected by an underlying sensor 14 (FIG. 7) the geared motor 8 causes the feed belt C to advance one step in a direction opposite to the preceding direction. In the filling step, the feed belt C is transferred from the second magazine 2 to the first magazine 1. This operation is repeated until all the tubes of the feed belt C have been filled, whereafter the loading control is de-energized and the dispenser is ready for use.

In the FIGS. 2 and 7 it can be seen that if the tubes are arranged on both faces of the belt 4, the opening 13 is oval and two sensors are provided. If the tubes are arranged only on a single face of the belt 4, the opening 13 is round and only one sensor 14 is provided.

In order that the filling of the feed belt of FIG. 4 may be more safely performed, means are provided to close the portion of the opening 13 cyclically not concerned by a tube to be filled. Said means may comprise, for example, one or more doors either of pivotable or of slidable type, mounted at the opening 13 and cyclically actuated by the tubes 3 during their step-by-step advance. Otherwise, said doors could be actuated by a servo-control whose operation is slaved to the movement of the tubes of the feed belt. These solutions have not been shown in the drawings because they may be easily conceived and constructed by those skilled in the art on the basis of the above teachings. Otherwise, as shown in the drawings, each tube 3 may be provided with a side tab L secured by the same rivets 15 which secure the tube to the belt 4, said tab being provided with a flat head which extends on the side of the belt 4 that is not provided with the tube so as to close the portion of the opening 13 that is not concerned by said tube during the filling of the feed belt. In order to avoid that the head of a tab L may be of hindrance to the free movement of the feed belt and may interfere with the tubes 3 when the feed belt is being stacked in the magazines 1-2, said head is so constructed as to protrude by a suitable extent X from the adjacent end of the tube 3 carrying the same.

The feed belts C as described are capable of being stacked in regular layers within the magazines 1 and 2, even if they are controlled from stationary points such as the driving sprockets 6 in FIG. 1. In order to facilitate the stacking of the feed belt C, said driving sprockets may be arranged intermediately of the respective magazines 1 and 2, and not in proximity of a sidewall thereof.

Unlike what has been described and shown, the sprockets 6 can drivingly mesh, by means of pins, with holes obtained in the belt 4, the whole in a manner which may be easily conceived and carried into effect by those skilled in the art.

To achieve a better utilization of the volumes in the magazines 1 and 2, the partition Z common to said magazines may be flexible to conform to the filling of a magazine and emptying of the other one, and to facilitate the stacking and build up of the feed belt C.

I claim:

1. An automatic dispenser for dispensing any article, comprising:
   at least one feed belt, including at least one belt or other flexible element, having secured thereon transversely-arranged and equally spaced apart tubes open at both ends, capable of receiving therein the article to be dispensed;

a first magazine in which said feed belt, with its tubes filled with articles which are held inside said tubes, the ends of which are closed by the sidewalls of the said first magazine, is stacked in a plurality of layers;

a second magazine arranged in any manner with respect to the preceding one, in which the feed belt with empty tubes, after having articles dispensed therefrom, is gathered and stacked in a plurality of superimposed layers;

means for positively driving and guiding the feed belt for transfer from said first magazine to said second magazine and for submitting the belt of said feed belt to a limited torsion about its longitudinal axis, first in one direction and then in the other direction, so that in a region between said two magazines one end of said tubes will be directed downwards, for example in a vertical position, and the lower end thereof will be aligned with a lower opening through which the article is discharged to fall onto a discharge chute;

means controlling the step-by-step advance of the feed belt and resulting dispensation of the article on condition that payment is introduced into payment processing means.

2. A dispenser according to claim 1, in which the means for submitting the feed belt to a torsion about its longitudinal axis consist of a stationary helical tubular guide having rectangular section.

3. A dispenser according to claim 1, comprising control means for pre-setting said dispenser to be loaded by advancing the feed belt step by step in a direction from said second magazine to said first magazine, the arrangement being such that in the region where the empty tubes are directed downwards—preferably, after they have overstepped the lower opening through which the article is discharged—the top end of said tubes will become coincident with an upper opening through which a new article may be introduced into said tubes.

4. A dispenser according to claim 1, in which the tubes of the feed belt are arranged only on one face of said belt.

5. A dispenser according to claim 1 in which the tubes of the feed belt are arranged on both faces of the belt, and the tubes on one face are equally spaced from the tubes of the other face.

6. A dispenser according to claim 1, in which the distance between two successive tubes arranged on the same face of the belt of the feed belt, is slightly larger than the width or diameter of a tube, so that during the stacking of the feed belt in the magazines, the tubes of one layer will become interposed between the tubes of the underlying layer.

7. A dispenser according to claim 5, in which the opening for discharging the product from the feed belt and the opening for introducing the article into the feed belt have an oval outline for co-operating with both tubes arranged on the two faces of the belt.

8. A dispenser according to claim 7, comprising means for closing cyclically the portion of the article-loading aperture that is not concerned by the tube of the feed belt that cyclically is positioned under said opening, so as to avoid any incorrect loading of articles.

9. A dispenser according to claim 8, in which said tubes have secured thereto a tab provided at the free end thereof with a head which is located on the side of the belt which is opposite to that having said tube secured thereto, said tab being such as to close the portion of the loading aperture which is not concerned by said tube, the head of said tab being suitably protruding with respect to the upper end of the tube associated therewith, to avoid interference with the tube therebelow or thereabove when the belt-type charger is stacked in the magazine.

10. A dispenser according to claim 1, in which the transfer of the feed belt from the first magazine to the second magazine is effected by pairs of sprockets (6) interconnected kinematically, actuated by a reversible gearmotor and capable of meshing with the tubes of the feed belt.

11. A dispenser according to claim 3, comprising sensors which detect the correct introduction of an article into each said tube and cause the automatic step-by-step advance of said feed belt from said second magazine toward said first magazine for reloading.

12. A dispenser according to claim 1, comprising a plurality of side-by-side feed belts, arranged in respective magazines, controlled by respective advance and guide means and discharging the article to be dispensed onto a single chute which is arranged transversely below the portion of said feed belts that is passing from a magazine to the other one.

13. A dispenser according to claim 1, in which said first and second magazines are separated from each other by a flexible wall which by conforming to the filling of a magazine and emptying of the other one, facilitates the stacking and build up of the feed belt.

* * * * *